United States Patent
Ye

(10) Patent No.: US 10,261,365 B2
(45) Date of Patent: Apr. 16, 2019

(54) LIQUID CRYSTAL DISPLAY PANEL AND MANUFACTURING METHOD THEREOF

(71) Applicant: SHENZHEN CHINA STAR OPTOELECTRONICS TECHNOLOGY CO., LTD, Guangdong (CN)

(72) Inventor: Chengliang Ye, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 14/771,639

(22) PCT Filed: Aug. 4, 2015

(86) PCT No.: PCT/CN2015/086030
§ 371 (c)(1),
(2) Date: Aug. 31, 2015

(87) PCT Pub. No.: WO2017/008358
PCT Pub. Date: Jan. 19, 2017

(65) Prior Publication Data
US 2018/0120602 A1     May 3, 2018

(30) Foreign Application Priority Data

Jul. 16, 2015 (CN) .......................... 2015 1 0420133

(51) Int. Cl.
*G02F 1/1339*     (2006.01)
*G02F 1/1337*     (2006.01)
*G02F 1/1335*     (2006.01)

(52) U.S. Cl.
CPC .......... *G02F 1/1339* (2013.01); *G02F 1/1337* (2013.01); *G02F 1/13394* (2013.01); *G02F 1/133753* (2013.01); *G02F 1/133788* (2013.01); *G02F 1/133512* (2013.01); *G02F 2001/133757* (2013.01)

(58) Field of Classification Search
CPC ............. G02F 1/1339; G02F 1/133512; G02F 1/1337; G02F 1/133707; G02F 1/13394; G02F 2001/13396; G02F 1/133788; G02F 2001/136222
See application file for complete search history.

(56) References Cited

U.S. PATENT DOCUMENTS

2010/0157223 A1*   6/2010   Shin .................. G02F 1/133753
                                                 349/129
2014/0127840 A1*   5/2014   Baek .................. G02F 1/13394
                                                 438/28

* cited by examiner

*Primary Examiner* — Nathanael R Briggs
(74) *Attorney, Agent, or Firm* — Mark M. Friedman

(57) ABSTRACT

A liquid crystal display panel and a manufacturing method thereof are provided. The panel comprises: a first substrate, having a first alignment film formed by performing optical alignment to a first alignment-film material by taking data lines as a first optical alignment reference; and a second substrate, having a second alignment formed by performing optical alignment to a second alignment-film material by taking a connecting line of at least two auxiliary spacers as a second optical alignment reference.

16 Claims, 2 Drawing Sheets

LIQUID CRYSTAL DISPLAY PANEL AND MANUFACTURING METHOD THEREOF

BACKGROUND OF THE INVENTION

Field of the Invention

The present invention relates to the technical field of liquid crystal displays, and more particularly to a liquid crystal display panel and a manufacturing method thereof.

Description of the Related Art

As shown in FIG. 1 and FIG. 2, an existing liquid crystal display panel includes: a first substrate 10 and a second substrate 20; the first substrate 10 is for example a COA (color filter on array) substrate, that is, a color filter film is manufactured on an array substrate, and the first substrate 10 includes a plurality of data lines 12 and a plurality of scanning lines 11; and a black matrix 13 is provided on the second substrate 20.

An alignment-film material is coated onto an inner side of the first substrate. During the formation of an alignment film, an image sensor performs top and down alignment, according to the positions of the data lines 12 on both sides of a pixel unit, to two partitions on the lift side and two partitions on the right side of four partitions 101-104 of the pixel unit. An alignment-film material is also coated onto an inner side of the second substrate. A projection, on the second substrate, of the pixel unit has two partitions 105 and 106. During the formation of the alignment film, the image sensor performs left and right alignment, according to the position of the black matrix 13 on both sides of the pixel unit, to those two partitions. Finally, after both of the substrates are combined together, four display domains are formed in each pixel, as shown by references 201-204 in FIG. 3.

However, in a case where the first substrate is a BOA (BM on array) substrate, as for a BOA substrate, the black matrix on the second substrate is also manufactured onto the array substrate, thus the second substrate would be lack of a reference for the alignment by the image sensor. As a result, a substrate opposite to a BOA substrate cannot be aligned by using the image sensor, such that the display effect of the display panel is poor.

Therefore, it is necessary to provide a liquid crystal display panel and a manufacturing method thereof to overcome the problems existing in the conventional technology.

SUMMARY OF THE INVENTION

An objective of the present invention is to provide a liquid crystal display panel and a manufacturing method thereof, to solve a technical problem, existing in the prior art, that a substrate opposite to the BOA (Black Matrix on array) substrate cannot be aligned by using an image sensor and thus the display effect is poor.

In order to solve the above technical problem, the present invention proposes a liquid crystal display panel, including:
  a first substrate including:
  a color resist layer;
  a light-shielding layer having a plurality of light-shielding blocks;
  a device array layer having a plurality of data lines, a plurality of scanning lines, and a plurality of pixel units defined by the data lines and the scanning lines; and
  a first alignment film being formed by performing optical alignment to a first alignment-film material by taking the data lines as a first optical alignment reference;
  a second substrate including:
  a spacer combination layer having a plurality of primary spacers, a plurality of secondary spacers and a plurality of auxiliary spacers; and
  a second alignment film being formed by performing optical alignment to a second alignment-film material by taking a connecting line of at least two of the auxiliary spacers as a second optical alignment reference; wherein the position of the connecting line of the at least two of the auxiliary spacers corresponds to the position of a projection, on the second substrate, of one of the scanning lines; and wherein the auxiliary spacers are formed by the same photomasking process as for the primary spacers and/or the secondary spacers; and
  a liquid crystal layer being disposed between the first substrate and the second substrate.

In the liquid crystal display panel of the present invention, the auxiliary spacers are spaced apart from the primary spacers and the secondary spacers, respectively.

In the liquid crystal display panel of the present invention, the auxiliary spacers have a distance of at least 5 um from the primary spacers.

In the liquid crystal display panel of the present invention, the auxiliary spacers have a distance of at least 5 um from the secondary spacers.

In the liquid crystal display panel of the present invention, the height of the primary spacers is greater than that of the secondary spacers, and the height of the secondary spacers is greater than that of the auxiliary spacers.

In the liquid crystal display panel of the present invention, the first alignment film comprises a first region, a second region, a third region and a fourth region; wherein an alignment film portion in the first region and an alignment film portion in the second region are distributed in a first direction; and an alignment film portion in the third region and an alignment film portion in the fourth region are distributed in a second direction; and the second alignment film comprises a fifth region and a sixth region; wherein an alignment film portion in the fifth region is distributed in a third direction; an alignment film portion in the sixth region is distributed in a fourth direction; wherein the fifth region corresponds to the first region and the third region, and the sixth region corresponds to the second region and the fourth region.

In the liquid crystal display panel of the present invention, a spacing between two adjacent auxiliary spacers in the second optical alignment reference is greater than 10 um and less than or equal to 14 um.

In order to solve the above technical problem, the present invention proposes another liquid crystal display panel, including:
  a first substrate including:
  a color resist layer;
  a light-shielding layer having a plurality of light-shielding blocks;
  a device array layer having a plurality of data lines, a plurality of scanning lines, and a plurality of pixel units defined by the data lines and the scanning lines; and
  a first alignment film being formed by performing optical alignment to a first alignment-film material by taking the data lines as a first optical alignment reference;
  a second substrate including:
  a spacer combination layer having a plurality of primary spacers, a plurality of secondary spacers and a plurality of auxiliary spacers; and
  a second alignment film being formed by performing optical alignment to a second alignment-film material by taking a connecting line of at least two of the auxiliary spacers as a second optical alignment reference; and a liquid crystal layer being disposed between the first substrate and the second substrate.

In the liquid crystal display panel of the present invention, the position of the connecting line of the at least two of the auxiliary spacers corresponds to the position of a projection, on the second substrate, of one of the scanning lines.

In the liquid crystal display panel of the present invention, the auxiliary spacers are formed by the same photomasking process as for the primary spacers and/or the secondary spacers.

In the liquid crystal display panel of the present invention, the auxiliary spacers are spaced apart from the primary spacers and the secondary spacers, respectively.

In the liquid crystal display panel of the present invention, the height of the primary spacers is greater than that of the secondary spacers, and the height of the secondary spacers is greater than that of the auxiliary spacers.

In the liquid crystal display panel of the present invention, the first alignment film comprises a first region, a second region, a third region and a fourth region; wherein an alignment film portion in the first region and an alignment film portion in the second region are distributed in a first direction; and an alignment film portion in the third region and an alignment film portion in the fourth region are distributed in a second direction; and the second alignment film comprises a fifth region and a sixth region; wherein an alignment film portion in the fifth region is distributed in a third direction; an alignment film portion in the sixth region is distributed in a fourth direction; wherein the fifth region corresponds to the first region and the third region, and the sixth region corresponds to the second region and the fourth region.

The present invention further provides a method for manufacturing the foregoing liquid crystal display panel, includes steps of:

performing optical alignment to a first alignment-film material on the first substrate by taking the data line as the first optical alignment reference, to form the first alignment film on the first substrate;

performing optical alignment to a second alignment-film material on the second substrate by taking a connecting line of at least two of the auxiliary spacers as the second optical alignment reference, to form the second alignment film on the second substrate; and combining the first substrate and the second substrate together, and providing the liquid crystal layer between the combined first substrate and second substrate.

In the method for manufacturing the liquid crystal display panel of the present invention, the position of the connecting line of the at least two of the auxiliary spacers corresponds to the position of a projection, on the second substrate, of one of the scanning lines.

In the method for manufacturing the liquid crystal display panel of the present invention, the auxiliary spacers are formed by the same photomasking process as for the primary spacers and/or the secondary spacers.

In the method for manufacturing the liquid crystal display panel of the present invention, the auxiliary spacers are spaced apart from the primary spacers and the secondary spacers, respectively.

In the method for manufacturing the liquid crystal display panel of the present invention, the height of the primary spacers is greater than that of the secondary spacers, and the height of the secondary spacers is greater than that of the auxiliary spacers.

In the method for manufacturing the liquid crystal display panel of the present invention, a spacing between two adjacent auxiliary spacers in the second optical alignment reference is greater than 10 um and less than or equal to 14 um.

With the liquid crystal display panel and the manufacturing method thereof of the present invention, by providing an optical alignment reference onto the substrate opposite to the array substrate, the accuracy of optical alignment of the substrate is improved. In this way, the display effect is improved.

DETAILED DESCRIPTION OF THE PREFERRED EMBODIMENTS

In the following detailed description of the present invention, references are made to the accompanying drawings that show, by way of illustration, specific embodiments in which the invention may be practiced. The foregoing objects, features and advantages adopted by the present invention can be best understood by referring to the following detailed description of the preferred embodiments and the accompanying drawings. The directional terms described in the present invention, such as upper, lower, front, rear, left, right, inner, outer, side, etc., are only directions with reference to the accompanying drawings, so that the used directional terms are used to describe and understand the present invention, but the present invention is not limited thereto.

Figure 4:
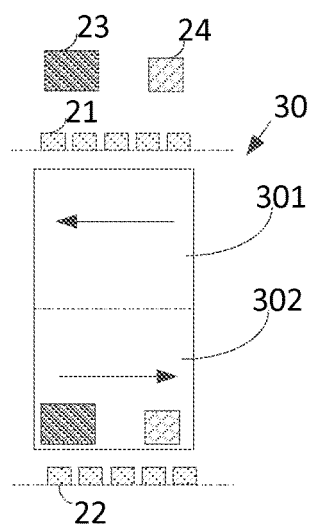
FIG. 4 is a schematic diagram of optical alignment of an individual pixel on a second substrate of the present invention.

Referring to FIG. 4, a schematic diagram of optical alignment of an individual pixel on a second substrate of the present invention is shown.

A liquid crystal display panel of the present invention is provided, including a first substrate, a second substrate, and a liquid crystal layer. The liquid crystal layer is disposed between the first substrate and the second substrate.

The first substrate includes: a color resist layer, a light-shielding layer, a device array layer, and a first alignment film; the light-shielding layer includes a light-shielding block, i.e. a black matrix; the device array layer includes a plurality of data lines, a plurality of scanning lines and a plurality of pixel units defined by the data lines and the scanning lines; and the first alignment film is formed by performing optical alignment to a first alignment-film material by taking the data lines as a first optical alignment reference.

As shown in FIG. 4, the second substrate 30 includes a spacer combination layer and a second alignment film; the spacer combination layer includes primary spacers 23, secondary spacers 24 and auxiliary spacers 21 and 22; the second alignment film is formed by performing optical alignment to a second alignment-film material by taking a connecting line of at least two of the auxiliary spacers as a second optical alignment reference, that is, each of the second optical alignment references is constituted of the connecting line of at least two of the auxiliary spacers.

The first substrate may further include a first transparent conductive layer including a pixel electrode. The second substrate may further include a second transparent conductive layer including a common electrode.

As there is no black matrix arranged on the second substrate of the liquid crystal display panel in the prior art, the specific position for optical alignment cannot be set by the image sensor, so that the machine cannot perform alignment according to predetermined parameters. Whereas, in the present invention, by providing the second optical alignment reference on the second substrate, the image sensor can set the specific position for optical alignment conveniently; and as a result, both the accuracy of the optical alignment and the display effect are improved.

Preferably, the position of the connecting line of at least two of the auxiliary spacers 21 or 22 corresponds to the position of a projection, on the second substrate, of one of the scanning lines. That is, at least two of the auxiliary spacers are arranged according to the position of a projection, on the second substrate, of the scanning line. A connecting line of at least two of the auxiliary spacers 21 corresponds to a scanning line on an upper side of the pixel unit, and a connecting line of at least two of the auxiliary spacers 22 corresponds to another scanning line on a lower side of the pixel unit.

Since the pixel units are defined by the data lines and the scanning lines, arranging the auxiliary spacers in a position corresponding to the scanning line makes the manufacturing process to be more simple and more convenient, and further improves the accuracy of the optical alignment of the second substrate, such that the alignment film on the second substrate is ensured to correspond to the alignment film on the first substrate. In this way, the display effect is improved greatly.

Preferably, the auxiliary spacers are formed by the same photomasking process as for the primary spacers and/or the secondary spacers. More preferably, the auxiliary spacers are formed by the same photomasking process as for the primary spacers and the secondary spacers so that the cost of production is saved.

As can be seen, each of the second optical alignment references includes at least two of the auxiliary spacers; more preferably, a spacing between two adjacent auxiliary spacers in the second optical alignment reference is greater than 10 um and less than or equal to 14 um. Such range is suitable while a smaller spacing may cause waste of the spacer material and increase the cost; and a larger spacing may cause that the accuracy of alignment cannot meet the requirement on high precision.

Preferably, the auxiliary spacers are spaced apart from the primary spacers and the secondary spacers, respectively. That is, the auxiliary spacers are not overlapped with the primary spacers and the secondary spacers, thus avoiding damaging the existing spacers.

Preferably, the height of the primary spacers is greater than that of the secondary spacers, and the height of the secondary spacers is greater than that of the auxiliary spacers. This can avoid influencing the supporting effect of the existing spacers.

Preferably, the primary spacers and the secondary spacers have a distance of at least 5 um from the auxiliary spacers, respectively, thus avoiding damaging the primary spacers and the secondary spacers during manufacturing.

Figure 1:
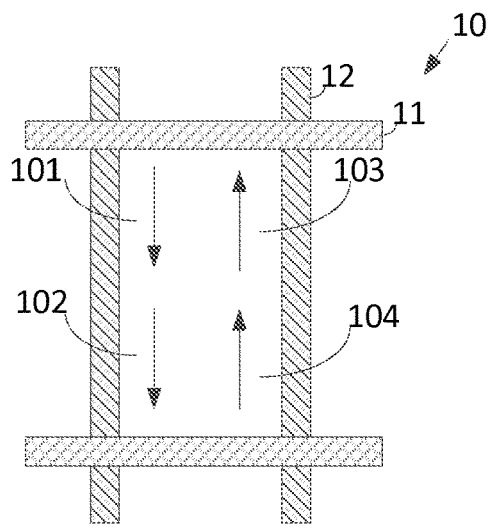
FIG. 1 is a schematic diagram of optical alignment of an individual pixel on a first substrate of the prior art.
Figure 2:
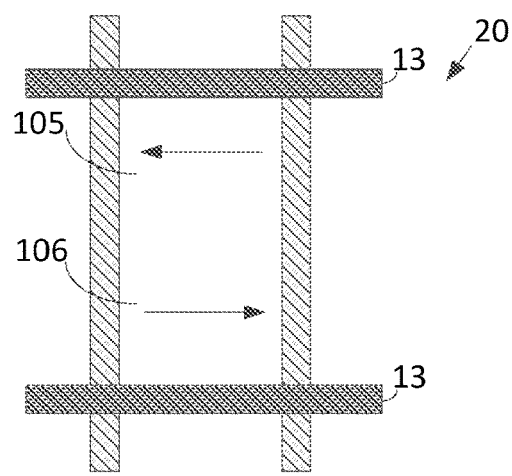
FIG. 2 is a schematic diagram of optical alignment of an individual pixel on a second substrate of the prior art.
Figure 3:
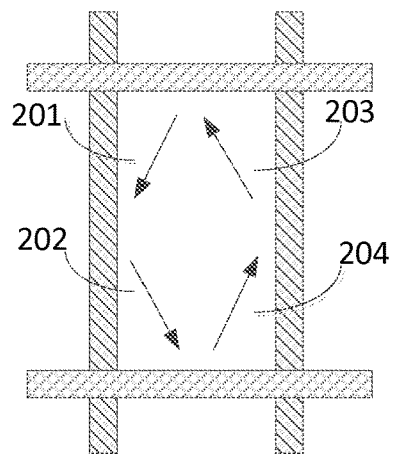
FIG. 3 is a schematic diagram of optical alignment of an individual pixel on a liquid crystal display panel of the prior art.

Preferably, with reference to FIG. 1, the first alignment film includes a first region 101, a second region 102, a third region 103 and a fourth region 104; wherein alignment film portions in both the first region 101 and the second region 102 are distributed in a first direction, for example, downward; and alignment film portions in both the third region 103 and the fourth region 104 are distributed in a second direction, for example, upward.

Preferably, as shown in FIG. 4, the second alignment film includes a fifth region 301 and a sixth region 302; wherein an alignment film portion in the fifth region 301 is distributed in a third direction, for example, rightward; an alignment film portion in the sixth region 302 is distributed in a fourth direction, for example, leftward; and the fifth region 301 corresponds to the first region 101 and the third region 103, and the sixth region 302 corresponds to the second region 102 and the fourth region 104. Hence, after the two substrates are combined together, the pixel unit has four display domains.

Preferably, the first region, the second region, the third region and the fourth region are equal in area. The area of the fifth region is equal to that of the sixth region. As a result, four display domains having the same size are easily obtained, which makes the color of the panel more uniform, thereby improving the contrast.

The method for manufacturing the liquid crystal display panel of the present invention includes the following steps:

S101: performing optical alignment to a first alignment-film material on the first substrate by taking the data lines as the first optical alignment reference, to form the first alignment film on the first substrate, where the first alignment-film material is for example polyimide, and after the first alignment-film material is irradiated by polarized light, the first alignment film is formed on the first substrate;

S102: performing optical alignment to a second alignment-film material on the second substrate by taking a connecting line of at least two of the auxiliary spacers as a second optical alignment reference, to form the second alignment film on the second substrate, where the second alignment-film material is for example polyimide, and after the second alignment-film material is irradiated by polarized light, the second alignment film is formed on the second substrate; that is, each of the second optical alignment references is constituted of the connecting line of at least two of the auxiliary spacers; and S103: combining the first substrate and the second substrate together and providing the liquid crystal layer between the combined first substrate and second substrate.

Preferably, the position of the connecting line of at least of the two auxiliary spacers corresponds to the position of a projection, on the second substrate, of one of the scanning lines. That is, the second reference is set according to the position of a projection, on the second substrate, of one of the scanning lines.

As the pixel units are defined by the data lines and the scanning lines, arranging the auxiliary spacers in a position corresponding to the scanning lines makes the manufacturing process more simple and more convenient, and further improves the accuracy of the optical alignment of the second substrate, such that the alignment film on the second substrate is ensured to correspond to the alignment film on the first substrate. In this way, the display effect is improved greatly.

Preferably, the auxiliary spacers are formed by the same photomasking process as for the primary spacers and/or the secondary spacers.

More preferably, that is, the spacer material is coated onto the second substrate, and the spacer material is developed and exposed by the same mask plate to form the auxiliary spacers, the primary spacers and the secondary spacers.

As can be seen, each of the second optical alignment references includes at least two of the auxiliary spacers; more preferably, a spacing between two adjacent auxiliary spacers in the second optical alignment reference is greater than 10 um and less than or equal to 14 um. Such range is suitable while a smaller spacing may cause waste of the spacer material and increase the cost; and a larger spacing may cause that the accuracy of alignment cannot meet the requirement on high precision Preferably, the auxiliary spacers are spaced apart from the primary spacers and the secondary spacers, respectively. That is, the auxiliary spacers are overlapped with the primary spacers and the secondary spacers, thus avoiding damaging the existing spacers.

Preferably, the height of the primary spacers is greater than that of the secondary spacers, and the height of the secondary spacers is greater than that of the auxiliary spacers. This can avoid influencing the supporting effect of the existing spacers.

Preferably, with reference to FIG. 1, the first alignment film includes a first region 101, a second region 102, a third region 103 and a fourth region 104; wherein alignment film portions in both the first region 101 and the second region 102 are distributed in a first direction, for example, downward; and alignment film portions in both the third region 103 and the fourth region 104 are distributed in a second direction, for example, upward;

That is, the first region and the second region are irradiated by polarized light from the first direction to obtain alignment film portions distributed in the first direction in both the first region and the second region; and the third region and the fourth region are irradiated by polarized light from the second direction to obtain alignment film portions distributed in the second direction in both the third region and the fourth region.

Preferably, as shown in FIG. 4, the second alignment film includes a fifth region 301 and a sixth region 302; wherein an alignment film portion in the fifth region 301 is distributed in a third direction, for example, rightward; an alignment film portion in the sixth region 302 is distributed in a fourth direction, for example, leftward; the fifth region 301 corresponds to the first region 101 and the third region 103, and the sixth region 302 corresponds to the second region 102 and the fourth region 104. Hence, after the two substrates are combined together, the pixel unit has four display domains.

That is, the fifth region is irradiated by polarized light from the third direction to obtain the alignment film portion distributed in the third direction in the fifth region; and the sixth region is irradiated by polarized light from the fourth direction to obtain the alignment film portion distributed in the fourth direction in the sixth region.

Preferably, the first region, the second region, the third region and the fourth region are equal in area. The area of the fifth region is equal to that of the sixth region. As a result, four display domains of the same size are obtained.

With the liquid crystal display panel and the manufacturing method thereof of the present invention, by providing an optical alignment reference onto the substrate opposite to the array substrate, the accuracy of optical alignment of the substrate is improved. In this way, the display effect is improved.

In conclusion, although the present invention has been described with reference to the preferred embodiment thereof, it is apparent to those skilled in the art that a variety of modifications and changes may be made without departing from the scope of the present invention which is intended to be defined by the appended claims.

What is claimed is:
1. A liquid crystal display panel comprising:
  a first substrate including:
  a color resist layer;
  a light-shielding layer having a plurality of light-shielding blocks;
  a device array layer having a plurality of data lines, a plurality of scanning lines, and a plurality of pixel units defined by the data lines and the scanning lines; and
  a first alignment film being formed by performing optical alignment to a first alignment-film material by taking the data lines as a first optical alignment reference;
  a second substrate including:
  a spacer combination layer having a plurality of primary spacers, a plurality of secondary spacers and a plurality of auxiliary spacers; and
  a second alignment film being formed by performing optical alignment to a second alignment-film material by taking a connecting line of at least two of the auxiliary spacers as a second optical alignment reference; wherein the position of the connecting line of the at least two of the auxiliary spacers corresponds to the position of a projection, on the second substrate, of one of the scanning lines; and wherein the auxiliary spacers are formed by the same photomasking process as for the primary spacers and/or the secondary spacers; and
  a liquid crystal layer being disposed between the first substrate and the second substrate;
  wherein the height of the primary spacers is greater than that of the secondary spacers, and the height of the secondary spacers is greater than that of the auxiliary spacers; wherein the connecting line of at least two of the auxiliary spacers is taken as the second optical alignment reference for an image sensor to set for optical alignment.

2. The liquid crystal display panel as claimed in claim 1, wherein the auxiliary spacers are spaced apart from the primary spacers and the secondary spacers, respectively.

3. The liquid crystal display panel as claimed in claim 2, wherein the auxiliary spacers have a distance of at least 5 μm from the primary spacers.

4. The liquid crystal display panel as claimed in claim 2, wherein the auxiliary spacers have a distance of at least 5 μm from the secondary spacers.

5. The liquid crystal display panel as claimed in claim 1, wherein
  the first alignment film comprises a first region, a second region, a third region and a fourth region; wherein an alignment film portion in the first region and an alignment film portion in the second region are distributed in a first direction; and an alignment film portion in the third region and an alignment film portion in the fourth region are distributed in a second direction; and
  the second alignment film comprises a fifth region and a sixth region; wherein an alignment film portion in the fifth region is distributed in a third direction; an alignment film portion in the sixth region is distributed in a fourth direction; wherein the fifth region corresponds to the first region and the third region, and the sixth region corresponds to the second region and the fourth region.

6. The liquid crystal display panel as claimed in claim 1, wherein a spacing between two adjacent auxiliary spacers in the second optical alignment reference is greater than 10 μm and less than or equal to 14 μm.

7. A liquid crystal display panel comprising:
a first substrate including:
a color resist layer;
a light-shielding layer having a plurality of light-shielding blocks;
a device array layer having a plurality of data lines, a plurality of scanning lines, and a plurality of pixel units defined by the data lines and the scanning lines; and
a first alignment film being formed by performing optical alignment to a first alignment-film material by taking the data lines as a first optical alignment reference;
a second substrate including:
a spacer combination layer having a plurality of primary spacers, a plurality of secondary spacers and a plurality of auxiliary spacers; and
a second alignment film being formed by performing optical alignment to a second alignment-film material by taking a connecting line of at least two of the auxiliary spacers as a second optical alignment reference; and
a liquid crystal layer being disposed between the first substrate and the second substrates;
wherein the height of the primary spacers is greater than that of the secondary spacers, and the height of the secondary spacers is greater than that of the auxiliary spacers; wherein the connecting line of at least two of the auxiliary spacers is taken as the second optical alignment reference for an image sensor to set for optical alignment.

8. The liquid crystal display panel as claimed in claim 7, wherein the position of the connecting line of the at least two of the auxiliary spacers corresponds to the position of a projection, on the second substrate, of one of the scanning lines.

9. The liquid crystal display panel as claimed in claim 7, wherein the auxiliary spacers are formed by the same photomasking process as for the primary spacers and/or the secondary spacers.

10. The liquid crystal display panel as claimed in claim 7, wherein the auxiliary spacers are spaced apart from the primary spacers and the secondary spacers, respectively.

11. The liquid crystal display panel as claimed in claim 7, wherein the first alignment film comprises a first region, a second region, a third region and a fourth region; wherein an alignment film portion in the first region and an alignment film portion in the second region are distributed in a first direction; and an alignment film portion in the third region and an alignment film portion in the fourth region are distributed in a second direction; and
the second alignment film comprises a fifth region and a sixth region; wherein an alignment film portion in the fifth region is distributed in a third direction; an alignment film portion in the sixth region is distributed in a fourth direction; wherein the fifth region corresponds to the first region and the third region, and the sixth region corresponds to the second region and the fourth region.

12. A method for manufacturing the liquid crystal display panel as claimed in claim 7, comprising steps of:
performing optical alignment to a first alignment-film material on the first substrate by taking the data lines as the first optical alignment reference, to form the first alignment film on the first substrate;
performing optical alignment to a second alignment-film material on the second substrate by taking a connecting line of at least two of the auxiliary spacers as the second optical alignment reference, to form the second alignment film on the second substrate; and
combining the first substrate and the second substrate together, and providing the liquid crystal layer between the combined first substrate and second substrate.

13. The method for manufacturing the liquid crystal display panel as claimed in claim 12, wherein the position of the connecting line of the at least two of the auxiliary spacers corresponds to the position of a projection, on the second substrate, of one of the scanning lines.

14. The method for manufacturing the liquid crystal display panel as claimed in claim 12, wherein the auxiliary spacers are formed by the same photomasking process as for the primary spacers and/or the secondary spacers.

15. The method for manufacturing the liquid crystal display panel as claimed in claim 12, wherein the auxiliary spacers are spaced apart from the primary spacers and the secondary spacers, respectively.

16. The method for manufacturing the liquid crystal display panel as claimed in claim 12, wherein a spacing between two adjacent auxiliary spacers in the second optical alignment reference is greater than 10 μm and less than or equal to 14 μm.

* * * * *